(No Model.) 2 Sheets—Sheet 1.

S. RUTH.
CAN SOLDERING MACHINE.

No. 489,269. Patented Jan. 3, 1893.

WITNESSES
Dan'l Fisher
George A Hemsley

INVENTOR
Sylvester Ruth
by W. T. Howard
atty (No Model.) 2 Sheets—Sheet 2.

S. RUTH.
CAN SOLDERING MACHINE.

No. 489,269. Patented Jan. 3, 1893.

UNITED STATES PATENT OFFICE.

SYLVESTER RUTH, OF BALTIMORE, MARYLAND.

CAN-SOLDERING MACHINE.

SPECIFICATION forming part of Letters Patent No. 489,269, dated January 3, 1893.

Application filed March 29, 1892. Serial No. 426,872. (No model.)

*To all whom it may concern:*

Be it known that I, SYLVESTER RUTH, of Baltimore, in the State of Maryland, have invented certain new and useful Improvements in Can-Soldering Machines, of which the following is a specification, reference being had to the accompanying drawings, and to the letters of reference marked thereon.

The invention relates to that class of can soldering machines in which the ends of a can are soldered to the body by dipping the circumferential edges of the can into melted solder contained in a trough, and at the same time causing the can to revolve in order that every portion of the circumferential edge may be brought into contact with the solder several times during its passage through the trough.

The object of my invention is to improve the heating devices by which the solder is maintained in a melted condition, and also to provide suitable means to cool the soldered edges, as will hereinafter be fully described.

Figure 1:
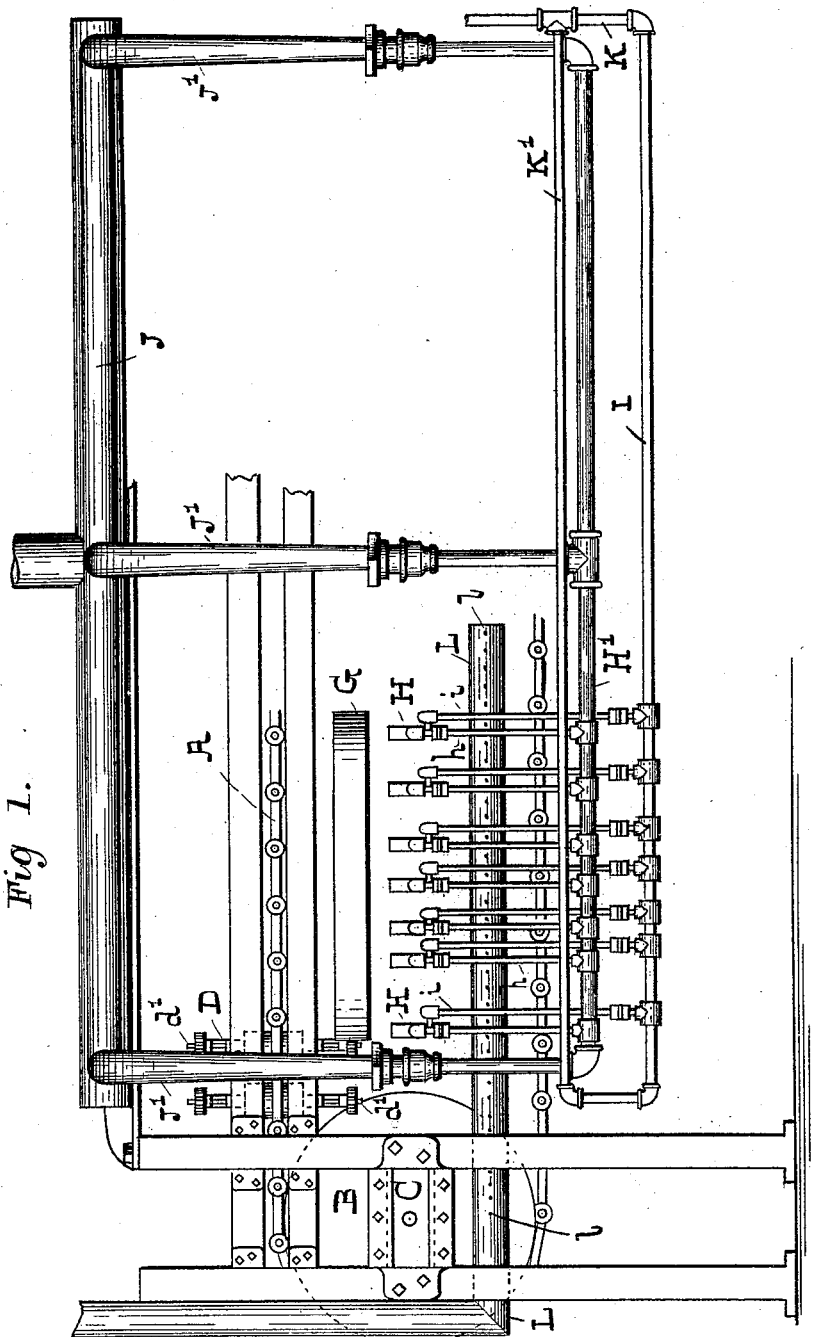
Figure 2:
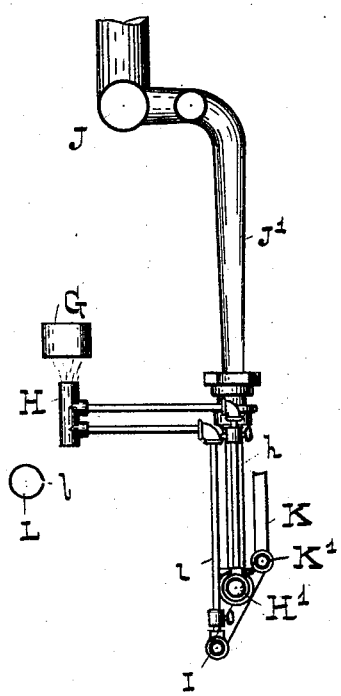
Figure 3:
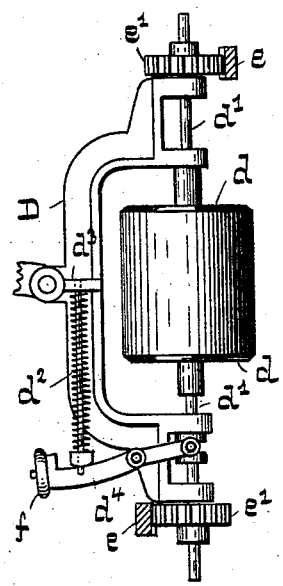
Figure 4:
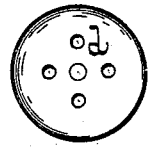

In the drawings Figure 1 is a side elevation of one end of a machine containing my improvements; Fig. 2 is an end view of the solder-trough and the heating devices, the air and gas supply pipes and the cooling pipe being in section; Fig. 3 is an elevation of a can carrier, detached; and Fig. 4 is a top view of one of two chucks between which a can is held.

Similar letters of reference indicate similar parts in the respective figures.

I will first describe, briefly, the general construction and operation of the machine.

A represents an endless chain or belt on and adapted to travel around two drums, only one being shown in the drawings and marked B. Each drum is supported in suitable frame work C. To the chain A a series of can carriers D is pivotally connected in such manner that the joints may work freely when the chain is passing around the drums. The cams are held in the carriers between two chucks $d$ $d$, perforated to let out the hot air and mounted on spindles $d'$ $d'$ suitably journaled in the carrier. One of these chucks is normally forced toward the other by a coiled spring $d^2$, bearing at one end against a fixed support $d^3$ on the carrier and at its other end against the free end of a lever $d^4$ pivoted on the carrier. The other end of this lever is connected by an ordinary strap to the spindle of a movable chuck. The tendency of the can carrier is to fall into a horizontal position, but the desired normal position of the carrier and its can is vertical except when the circumferential edge of the can is to be dipped in the melted solder.

In order to give the carriers and cans the proper positions at all times, suitable tracks or racks $e$ $e$ are provided with which pinions $e'$ $e'$ on the outer ends of the spindles $d'$ engage. These tracks maintain the carriers in a vertical position at all times except when the carriers arrive at the solder troughs. At these points the tracks are cam shaped to permit the carrier to assume an inclined position in order that the lower edge of the can may be dipped in the solder. The friction between the pinions $e'$ and racks $e$ will also cause the cans to be constantly rotated. The cans are automatically released from the carriers at the proper point by causing the disk $f$ on the free end of the lever $d^4$ to engage with a fixed cam surface, which causes the lever to retract the chuck, to whose spindle said lever is connected, against the force of the spring $d^2$, when the can may be readily removed.

I will now proceed to describe my improvements. G represents the solder trough and H H represent a series of burners located below it and extending its entire length. The burners may be of any well known construction adapted for use with a mixture of air and gas. To each burner two branch pipes $h$ and $i$ lead, the former to feed air and the latter to feed gas. All the branch pipes $h$ connect with the main pipe H', and all the branch pipes $i$ with the main pipe I. Air enters the supply pipe J about midway of its length, whence it is distributed by the vertical distributing pipes J' J' J' to both ends of the main pipe H' and also to a point about midway of its length. Gas is supplied to both ends of the pipe I through the supply-pipe K, which communicates directly with one end of the pipe I, and the supplemental pipe K' which leads from the pipe K to the other end of the pipe I. By this arrangement a uniform pressure of air and gas is maintained at each burner, and consequently the trough G will be uniformly heated throughout its entire length. This is a very important desideratum in these machines, for if the trough is not uniformly heated the solder will not be of uniform fluidity and consequently the soldering of the can will be defective. After the cans have passed through the soldering trough they are carried by the chain A in close proximity to a perforated pipe L. This pipe is so arranged that its perforations $l$ will be on a line with the edges of the cans which have just been soldered. Air is maintained at a pressure within the pipe L, which air will escape through the perforations and impinge on the soldered edges of the cans and thereby cool and solidify the solder. As before stated the cans are kept constantly revolving as long as they are in the carriers and therefore every portion of the soldered edge will be exposed to the air blast.

Having thus described my invention, I claim:

1. In a can-soldering-machine, a trough for solder into which the cans are to be dipped, in combination with a series of burners arranged below and extending the entire length of said trough, an air supply-pipe located above the burners, a main air-pipe below the burners with which connect the branch-pipes leading to the burners, a series of vertical distributing-pipes connecting the supply-pipe and the main pipe and supplying air to the latter at its ends and center, a main gas-pipe with which connect the branch pipes leading to the burner, a supplemental gas pipe located above the main gas-pipe, and a supply-pipe for supplying gas to the main and the supplemental pipes, substantially as described.

2. In a can-soldering machine, an endless belt and revoluble can-carriers pivotally connected to the belt, in combination with a trough containing molten solder into which the edges of the can are dipped, a series of burners arranged below and extending the entire length of said trough, an air supply-pipe located above the burners, a main air-pipe below the burners with which connect the branch-pipes leading to the burners, a series of vertical distributing-pipes connecting the supply-pipe and the main pipe and supplying air to the latter at its ends and center, a main gas-pipe with which connect the branch gas-pipes leading to the burner, a supplemental gas-pipe located above the main gas-pipe, a supply-pipe for supplying gas to the main and the supplemental pipes, and a perforated air pipe arranged to discharge air against the soldered edges of the cans, substantially as described.

SYLVESTER RUTH.

Witnesses:
E. F. FLAHERTY,
CHAS. E. SULER.